(12) United States Patent
Hecker et al.

(10) Patent No.: US 10,214,194 B2
(45) Date of Patent: Feb. 26, 2019

(54) SERVICE BRAKE DEVICE WITH QUICK AIR RELEASE VALVE

(71) Applicant: KNORR-BREMSE Systeme fuer Nutzfahrzeuge GmbH, Munich (DE)

(72) Inventors: Falk Hecker, Markgroeningen (DE); Michael Herges, Munich (DE); Gerhard Wieder, Besigheim (DE); Jacques Lanquetot, Trouville/Mer (FR); Vincent Boehler, Saint Desir (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/674,777

(22) Filed: Aug. 11, 2017

(65) Prior Publication Data

US 2017/0341635 A1 Nov. 30, 2017

Related U.S. Application Data

(63) Continuation of application No. PCT/EP2016/052749, filed on Feb. 9, 2016.

(30) Foreign Application Priority Data

Feb. 13, 2015 (DE) .................. 10 2015 102 127

(51) Int. Cl.
*B60T 8/34* (2006.01)
*B60T 8/36* (2006.01)
(Continued)

(52) U.S. Cl.
CPC .............. *B60T 15/52* (2013.01); *B60T 8/342* (2013.01); *B60T 8/3605* (2013.01); *B60T 8/50* (2013.01);
(Continued)

(58) Field of Classification Search
CPC . B60T 15/52; B60T 8/50; B60T 8/342; B60T 8/3605; B60T 17/043; B60T 13/662; B60T 17/088; B60T 8/34; B60T 8/343
(Continued)

(56) References Cited

U.S. PATENT DOCUMENTS 2,718,897 A 9/1955 Andrews
3,844,625 A * 10/1974 Ingram .................. B60T 8/348
188/170

(Continued)

FOREIGN PATENT DOCUMENTS

DE 1 086 559 8/1960
DE 10 2013 000 275 A1 7/2014
WO WO 99/38744 A1 8/1999

OTHER PUBLICATIONS

International Search Report (PCT/ISA/210) issued in PCT Application No. PCT/EP2016/052749 dated Jun. 24, 2016 with English translation (Six (6) pages).
(Continued)

*Primary Examiner* — Pamela Rodriguez
(74) *Attorney, Agent, or Firm* — Crowell & Moring LLP

(57) ABSTRACT

A service brake device for vehicles is provided which permits rapid venting of a service brake pressure chamber. The service brake device includes at least one pneumatic service brake device with at least one piston and/or a diaphragm. The piston and/or diaphragm delimits the service brake pressure chamber on one side which can be supplied with compressed air from a brake line for applying the service brake and can be purged of compressed air for releasing the service brake, delimits a spring chamber on the other side which receives a spring that prestresses the piston and/or the diaphragm in the release position of the service brake. The pressure chamber includes a pressure connection communicating with the brake line. A quick air release valve
(Continued)

between the brake line and the pressure chamber is arranged to connect the brake line to the pressure chamber when the pressure in the brake chamber is greater than in the pressure chamber, and to connect the pressure chamber to the spring chamber when the pressure in the pressure chamber is greater than the brake line pressure.

8 Claims, 2 Drawing Sheets

(51) Int. Cl.
  *B60T 8/50* (2006.01)
  *B60T 13/66* (2006.01)
  *B60T 15/52* (2006.01)
  *B60T 17/04* (2006.01)
  *B60T 17/08* (2006.01)
(52) U.S. Cl.
  CPC .......... *B60T 13/662* (2013.01); *B60T 17/043* (2013.01); *B60T 17/088* (2013.01); *B60T 8/34* (2013.01); *B60T 8/343* (2013.01)
(58) Field of Classification Search
  USPC .......... 303/127, 70, 75, 80, 81, 37, 14, 9.66; 137/519.5
  See application file for complete search history.

(56) References Cited

U.S. PATENT DOCUMENTS

| 3,981,545 | A | | 9/1976 | Eddy | |
|---|---|---|---|---|---|
| 4,577,910 | A | * | 3/1986 | Worbois | B60T 15/52 303/69 |
| 4,948,200 | A | * | 8/1990 | Leiber | B60T 8/4018 303/113.3 |
| 5,361,877 | A | * | 11/1994 | Graham | B60T 11/326 137/519.5 |
| 2006/0028062 | A1 | * | 2/2006 | Veltri | B60T 8/1893 303/118.1 |
| 2007/0029873 | A1 | | 2/2007 | Howell | |

OTHER PUBLICATIONS

German-language Written Opinion (PCT/ISA/237) issued in PCT Application No. PCT/EP2016/052749 dated Jun. 24, 2016 with English translation (Five (5) pages).
German-language Office Action issued in counterpart German Application No. 10 2015 102 127.7 dated Oct. 20, 2015 (Five (5) pages).
International Preliminary Report on Patentability (PCT/IB/338 & PCT/IB/373) issued in PCT Application No. PCT/EP2016/052749 dated Aug. 24, 2017, including English translation of document C2 (German-language Written Opinion (PCT/ISA/237)) previously filed on Aug. 11, 2017 (Thirteen (13) pages).

\* cited by examiner

SERVICE BRAKE DEVICE WITH QUICK AIR RELEASE VALVE

CROSS REFERENCE TO RELATED APPLICATIONS

This application is a continuation of PCT International Application No. PCT/EP2016/052749, filed Feb. 9, 2016, which claims priority under 35 U.S.C. § 119 from German Patent Application No. 10 2015 102 127.7, filed Feb. 13, 2015, the entire disclosures of which are herein expressly incorporated by reference.

BACKGROUND AND SUMMARY OF THE INVENTION

The invention relates to a service brake device for vehicles, comprising at least one compressed-air actuated service brake cylinder with at least one piston and/or a diaphragm, which on the one hand delimits a pressure chamber, which for applying the service brake can be supplied with compressed air and for releasing can be purged of the compressed air, and on the other hand delimits a spring chamber, which receives spring means preloading the piston and/or the diaphragm into the release position of the service brake, wherein the pressure chamber comprises a pressure connection, which can be charged and purged by a brake line.

Such service brake devices mostly have an ABS control. The objective of an anti-lock braking system (ABS) is to regulate or limit a brake slip that occurs on wheels to an optimum slip. An optimum brake slip amounts to for example 12%. The brake slip is determined by comparing the wheel speed of the wheel concerned with a central reference speed. To this end, the ABS control, starting out from a level corresponding to the respective brake request, can lower the brake pressure in the brake cylinders (pressure lowering), hold the brake pressure in the brake cylinders (pressure holding) and increase the brake pressure in the brake cylinders to the starting level corresponding to the brake request (pressure increasing).

With a service brake device known for example from DE 10 2013 000 275 A1 active pneumatic service brake cylinders in diaphragm and/or piston design are present, which in turn are supplied with compressed air via ABS pressure control valves arranged in the brake lines. During all charging or purging operations, the compressed air has to be conducted via the ABS pressure control valves which, dependent on the pressure ratio, takes place relatively slowly. In electronically (brake pressure) regulated brake systems (EBS), the brake cylinders will be charged or purged by pressure regulation modules which also control the brake pressure in the brake lines as part of the brake slip control (ABS). In the generic DE 10 2013 000 275 A1, a quick air release valve is arranged between the service brake valve and the ABS pressure control valves of the front axle. This quick air release valve responds to a quick releasing of the brake pedal by the driver and then ensures a rapid purging of the brake lines.

In the event of a full brake application with ABS control, the pressure reduction gradient during the pressure lowering plays a major role for the regulating quality and thus also for the stopping distance. Desirable during the pressure lowering as part of an ABS control intervention is as high as possible a pressure reduction gradient with rapid depressurization of the brake cylinders.

Compared with this, the invention is based on the object of further developing a service brake device of the type mentioned at the outset in such a manner that as fast as possible a depressurization of the brake cylinders is possible. This rapid depressurization is to be possible in particular in the event of an ABS control intervention.

SUMMARY OF THE INVENTION

The invention is based on the idea that a quick air release valve controlled by the pressure that is present in the brake line, which is connected with its first connection to the brake line, with its second connection to the pressure connection of the service brake cylinder and with its third connection to the spring chamber of the service brake cylinder, and which is designed so that it shuts off the first connection and connects the second connection to the third connection because of a pressure lowering brought about in the brake line.

A "pressure lowering brought about in the brake line" is to mean a lowering of the pressure with regard to a pressure that is present there beforehand.

Consequently, the lowered pressure is lower than the pressure present in the brake line beforehand.

The pressure in the brake line, during a pressure lowering phase initiated in particular by an ABS control, is then lowered for example by an ABS pressure control valve arranged upstream of the service brake cylinder and this lowered pressure fed into the first connection of the quick air release valve, as a consequence of which the same creates a connection between its second and third connection, as a result of which the pressure chamber and the spring chamber of the service brake cylinder are connected to one another. The first connection of the quick air release valve is here preferably shut off. Because of this, compressed air, which is still at the higher pressure shortly before the pressure lowering phase, of a pressure holding or pressure increasing phase, flows from the pressure chamber into the spring chamber and leads to a release force on the back of the piston or the diaphragm, which acts in addition to the spring forces of the spring means, which preload or bring the piston or the diaphragm into the release position. This additional release force then ensures a more rapid releasing of the brake cylinder or of the service brake as is advantageous in particular as part of a pressure lowering phase with an ABS control. In particular, the ABS control of the so-called first wheel interruption can thereby be markedly reduced.

During quick pressure lowering phases, such as occur for example as part of an ABS control, compressed air then no longer needs to be conducted via a long pneumatic brake line as far as to a quick air release valve distally arranged from the brake cylinder or as far as to the ABS pressure control valve or as far as to the pressure regulation module in order to be only purged there, which requires a certain time, as in DE 10 2013 000 275 A1. When the quick air release valve by contrast is preferably arranged directly and immediately on the service brake cylinder, the purge or flow path of the compressed air from the pressure chamber into the spring chamber of the service brake cylinder is very short, since both chambers are located closely next to one another.

It is also advantageous, in particular, that a simple and commercially available quick air release valve is entirely adequate in order to perform the functions described above. Thus, no quick air release valve has to be specifically produced for the service brake device according to the invention. This helps save production costs. The first connection of the quick air release valve then constitutes a control connection of the quick air release valve in a manner of speaking, which, (also) dependent on the pressure that is present at the first connection, connects its first connection with its second connection or its second connection with its third connection.

Through the measures mentioned in the subclaims advantageous further developments and improvements of the invention are possible.

Particularly preferably, the service brake device has an ABS control, wherein the pressure that is present in the brake line is controlled by the ABS control in the case of an activated ABS control. Particularly preferably, an ABS pressure control valve or a pressure regulation module with ABS functionality is then arranged upstream of the quick air release valve in the brake line, which brings about the pressure lowering in the brake line as part of the ABS control. In other words, the ABS pressure control valve or the pressure regulation module presets the control pressure at the first connection of the quick air release valve within the ABS control.

Alternatively, the pressure in the brake line and at the first connection of the quick air release valve can also be preset without the presence of an ABS or without an ABS control intervention dependent on the respective brake request by the driver or by a driver assistance system. The service brake device can then react very quickly to a cancellation of a brake request by way of the quick air release valve, which is advantageous especially with respect to the regulation quality of vehicle dynamics management systems, which then preset (at times) for example the pressure in the brake line.

Particularly preferably, the quick air release valve is designed so that because of a pressure holding or pressure increasing brought about in the brake line as part of the ABS control said quick air release valve connects the first connection to the second connection and shuts off the third connection. This characteristic already comprises the quick air release valve of the prior art described above so that such can also be employed for the preferred further development. As already explained above the pressure value assumed in the brake line beforehand or last, timewise, constitutes the measure for the pressure holding or pressure increasing.

The pressure that is present in the brake line, which (co) controls the quick air release valve at the first connection, is therefore preferably controlled by an ABS control in the case of an activated and existing ABS control. In other words, phases of the pressure holding, of the pressure lowering and of the pressure increasing are then cyclically generated by the ABS control, which then generate a corresponding pressure in the brake line which then (co) controls the quick air release valve.

The quick air release valve has a moveable valve closing link, which is equipped in order to close the first connection (also) dependent on the pressure that is present at the first connection, and in the process to connect the second connection to the third connection or close the third connection and in the process connect the first connection to the second connection. The quick air release valve used here is preferentially a commercially available quick air release valve which is preferably employed here for the sake of costs.

As already explained above, the quick air release valve is directly and immediately arranged on the service brake cylinder and attached to the same. This results in a very short flow path between the pressure chamber and the spring chamber of the service brake cylinder, which has an advantageous effect on the reaction speed of a cancellation of a brake request and in particular on the regulation quality of an ABS control.

In particular, the service brake device can be a pneumatic service brake device in particular with additional ABS function or an electropneumatic service brake device such as for example an electronically regulated brake system, in the case of which the brake pressure is regulated for example by means of one or more pressure regulation modules on at least one axle.

According to a development, a non-return valve is provided, via which the spring chamber can be purged relative to the atmosphere, for example in the form of a reed valve. Here, the dynamic pressure and thus the force ratios on the diaphragm or on the piston of the service brake cylinder can be influenced by way of the size of the flow cross section and the spring rate of the spring means of the non-return valve. The non-return valve advantageously prevents dirt and moisture entering from the outside because it prevents a flow in opposite direction, i.e. from the atmosphere into the spring chamber. The non-return valve reduces for example pressure in the spring chamber when the volume of the same diminishes in the application position and because of this the air present in it is compressed. This can also be the case when the service brake cylinder is combined with a spring brake actuator to form a combination cylinder and merely the spring brake actuator is applied. Then, the spring brake actuator piston rod pushes the diaphragm or the piston of the service brake cylinder into the application position as well.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
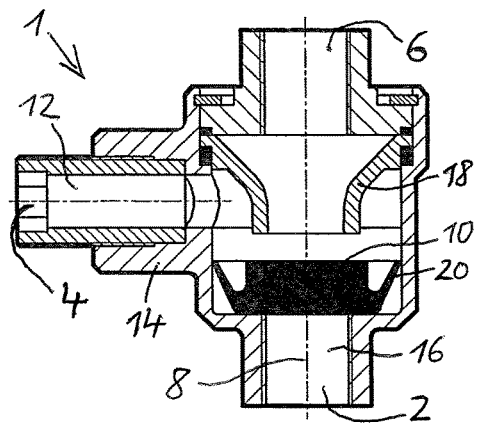
FIG. 1 shows a sectional representation of a quick air release valve according to the prior art.

FIG. 1 shows a pneumatically controlled quick air release valve 1 according to the prior art in sectional representation. The quick air release valve 1 has a first connection 2, a second connection 4 and a third connection 6, the first connection 2 constituting a control connection for feeding-in a pneumatic control pressure. The first connection 2 and the third connection 6 are arranged for example coaxially with respect to a center axis 8, along which a valve closing link 10 is axially moveable. The axis of the second connection 4 preferably stands perpendicularly to the center axis 8. The second connection 4 leads into a duct 12 in the interior of a valve housing 14, which seen in perpendicular direction is in flow connection with a further duct 16, which is coaxial with the center axis 8. In the further duct 16, a pipe connector 18 expanding in a direction from the first connection 2 to the third connection 6 is received. All three connections 2, 4 and 6 are designed in the manner of a pipe connector in order to be able to connect fittings for pneumatic lines or in order to be able to project into connections of pneumatic devices.

The valve closing link 10 is designed for example cylindrically and cap-like and on its radially outer edge has elastic lips 20, which can move along an inner wall of the further duct 16 in the valve housing 14. For example, the preferentially one-piece valve closing link 10 consists of an elastomer. The pipe connector 18 has a cylindrical starting section, which the valve closing link 10 can sealingly strike as on a valve seat and thereby close the third connection 6.

Figure 2:
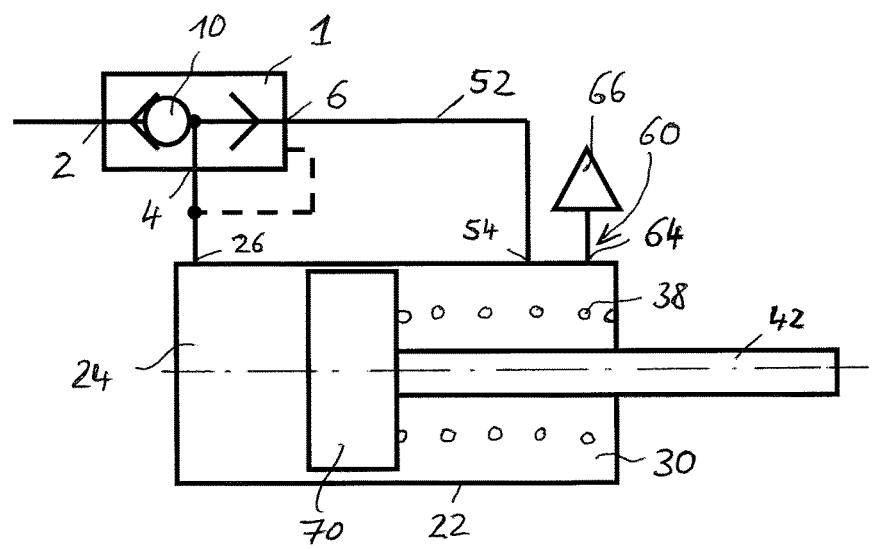
FIG. 2 shows a schematic circuit diagram of a service brake cylinder, on which a quick air release valve according to FIG. 1 is arranged according to an embodiment of the invention.
Figure 3:
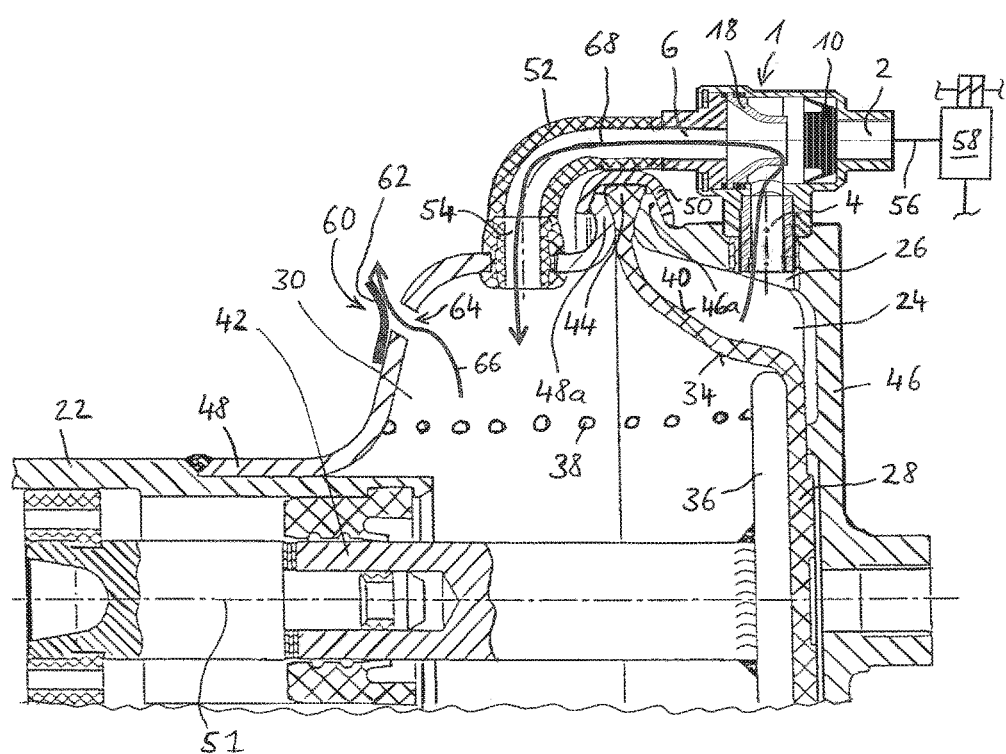
FIG. 3 shows a specific design embodiment of FIG. 2.

In the position of the valve closing link 10 shown in the FIGS. 1 to 3, the same closes the first connection 2. In this first switching position of the valve closing link 10, which is assumed by a low pressure at the first connection 2, the second connection 4 and the third connection 6 are therefore in flow connection with one another. When because of a pressure build-up at the first connection 2 the valve closing link 10 is forced along the center axis 8 in the direction of the pipe connector 18 and sealingly strikes the same, the third connection 6 according to a second switching position is closed and a flow connection between the first connection 2 and the second connection 4 established. The pipe connector 18 accordingly forms a valve seat for the valve closing link 10.

The elastic lips 20 of the valve closing link 10 are bent over under correspondingly high pressure at the first connection 2 so that a connection between the first connection 2 and the second connection 4 as well as the third connection 6 is possible even when the valve closing link 10 is located in a position near or at the first connection 2. The construction and the functioning of such a quick air release valve 1 are adequately known. They will therefore not be discussed further here.

The FIGS. 2 and 3 now show the use of such a quick air release valve 1 on a pneumatic service brake cylinder 22 of a pneumatic or electropneumatic service brake device. The service brake cylinder 22 is shown separately but it can also be structurally and functionally combined with a spring brake actuator which is not shown here to form a so-called combination cylinder.

The service brake cylinder 22 has a pressure chamber 24, into which a first inlet 26 extends, via which for actuating the service brake cylinder 22, compressed air is admitted and released. The compressed air acts on a diaphragm 28 inserted within the service brake cylinder 22, which with its first side 34 facing a spring chamber 30 supports itself on a thrust piece in the form of a stiff diaphragm disk 36. More precisely, the diaphragm 28 separates the pressure chamber 24 of the service brake cylinder 22 that can be charged and purged of compressed air from the spring chamber 30, which receives a return spring 38 supported on the diaphragm disk 36 and on the bottom of the service brake cylinder 22. The diaphragm 28 has a second side 40 facing towards the pressure chamber 24.

The diaphragm disk 36 is connected to a pressure rod 42 which interacts with a brake actuation mechanism outside the service brake cylinder 22. This can be for example actuation elements of a disk brake of a motor vehicle, in particular of a heavy utility vehicle. The service brake cylinder 22 is an active brake cylinder, i.e. the service brake is applied by charging the pressure chamber 24 and released by purging. The return spring 38 which on the one hand supports itself on the diaphragm spring 36 and on the other hand on the bottom of the service brake cylinder 22 ensures that the pressure rod 42 is returned into the release position (position according to FIG. 3) with a purged pressure chamber 24. On the other hand, the return spring 38 is compressed when the pressure chamber 24 is charged and because of this the diaphragm 28 together with the diaphragm disk 36 is shifted into the application position (to the left in FIG. 3).

A radially outer fastening edge 44 of the diaphragm 28 has a wedge-shaped cross section radially tapering towards the inside. This radially outer fastening edge 44 of the diaphragm with the wedge-shaped cross section tapering radially to the inside is clamped into a complementarily shaped mounting with wedge-shaped cross section expanding radially to the outside between a first housing part 46 and a second housing part 48 of the service brake cylinder 22. The first housing part 46 delimits the pressure chamber 24 and the second housing part 48 the pressure chamber 30 of the service brake cylinder 22, wherein their edges facing one another are formed as flanges 46a, 48a bent off radially to the outside, the inner surfaces of which facing one another form the mounting with wedge-shaped cross section between them. A circumferential clamping strap 50 engaging over the flanges 46a, 48a from the outside holds the two housing parts 46, 48 together, wherein the fastening edge 44 of the diaphragm is clamped in the mounting. A free, central part of the elastic diaphragm 28 can then move in a limited manner in the direction of the center axis 51 of the service brake cylinder 22 between the release position and the application position.

Immediately and directly on the valve housing 14 of the service brake cylinder 22 a quick air release valve 1 as shown in FIG. 1 is now attached. Here, the pipe connector-like second connection 4 directly projects into the first inlet 26 of the pressure chamber 24. The third connection 6 is in connection with a second inlet 54 of the spring chamber 30 via a short pneumatic line 52. The first connection 2 is in connection with an ABS pressure control valve 58 which is arranged for example distally from the service brake cylinder 22 via a brake line 56. Such an ABS pressure control valve 58 is thoroughly known and comprises an inlet/outlet valve combination, wherein the inlet valve in the opened state admits the brake pressure and shuts it off when closed. The opened outlet valve purges the brake pressure that is present in the upstream part of the brake line into the atmosphere.

Since the service brake device in the present case preferably is a pneumatic service brake device with ABS control and with two pneumatic ducts, front axle duct and rear axle duct, the brake slip regulation takes place in the known manner with the help of ABS pressure control valves 58, which control the brake pressure output from the respective duct of a service brake valve as a function of a deviation of an actual brake slip from a set brake slip. To this end, the ABS pressure control valves 58 are designed so that they feed the brake pressure output from the respective duct of the service brake valve through unchanged as far as the first connection 2 (pressure increasing), hold the brake pressure, i.e. shut off the brake pressure relative to the first connection 2 (pressure holding) or lower the brake pressure (pressure lowering). Thus, the phases pressure holding, pressure lowering and pressure increasing which are passed through as part of a typical cycle of an ABS control are controlled here by means of the ABS pressure control valves 58, wherein in the ABS intervention case a corresponding control pressure is then present at the first connection 2 of the quick air release valve 1 and controls the quick air release valve 1. Here, a separate ABS pressure control valve 58 is assigned for example to each wheel that is braked with the help of a service brake cylinder 22. However it is also conceivable for example in the case of a select low or select high ABS control that all wheels or service brake cylinders 22 on an axle are assigned only a single ABS pressure control valve 58.

Alternatively to ABS pressure control valves 58, the ABS control could also take place with the help of pressure regulation modules which are not shown here, which in each case comprise an inlet/outlet valve combination, a backup valve, a relay valve, a pressure sensor and a local electronic control unit, wherein such a pressure regulation module is electrically controlled with priority. In this case, the service brake device is electropneumatic and consists for example of an electronically regulated brake system (EBS) with brake pressure regulation. The ABS routines in this case are partly integrated in the electronic control unit of such a pressure regulation module, wherein the pressure regulation module in the ABS intervention case, i.e. in the case of excessive brake slip, then feeds a cycle of pressures corresponding to the respective excessive brake slip in each case (with or without ABS intervention) into the first connection 2.

Altogether, the quick air release valve 1 directly arranged on the service brake cylinder 22 is therefore arranged downstream of the associated ABS pressure control valve 58 and the service brake valve which is not shown here. In other words, the ABS pressure control valve 58 is arranged between the quick air release valve 1 and the service brake valve. In the case of an electropneumatic service brake device, the quick air release valve 1 is arranged downstream of the pressure regulation module.

It is easily conceivable by way of FIG. 1 that the switching behavior of the quick air release valve 1 is not only dependent on the pressure that is present at the first connection 2 but also on the pressures as they are present in each case at the second connection 4 and at the third connection 6, since these pressures likewise act on the valve closing link 10 in each case in the opposite direction.

The spring chamber 30 is in connection with the atmosphere for example via a non-return valve 60 for example in the form of a reed valve. The non-return valve 60 admits a pressure airflow in the direction from the spring chamber 30 into the atmosphere but blocks it in opposite direction. The reed valve comprises at least one spring-loaded and/or elastic element 62, which is tensioned against a passage opening 64 in the second housing part 48 of the service brake cylinder 22 in order to sealingly close the same. When the pressure in the spring chamber 30 exceeds a predetermined limit pressure, the non-return valve 60 opens because of the fact that the elastic element 62 lifts off the edge of the passage opening 64 and is bent over towards the outside, as a result of which a flow connection between the spring chamber 30 and the atmosphere is created and compressed air flows out of the spring chamber 30 to the outside. This situation is shown in FIG. 3 and symbolized by a first arrow 66.

When no ABS control intervention takes place, the ABS pressure control valve 58 feeds the brake pressure output from the corresponding duct of the service brake valve through to the first connection 2 unchanged. Since this brake pressure is generally greater than the atmospheric pressure, which is present in the release state in the spring chamber 30, the pressure at the first connection 2 is greater than on the third connection 6 or even on the second connection 4, at which the pressure that is even lower before the brake application is present in the pressure chamber 24, so that the valve closing link 10 is pushed against the pipe connector 18 as valve seat and closes the third connection 6. A connection between the first connection 2 and the second connection 4 is then established as a result of which the brake pressure enters the pressure chamber 24 and loads the second side 40 of the diaphragm 28. Since the pressure in the spring chamber 30 is lower than the pressure in the pressure chamber 24, the central part of the diaphragm 28 together with the diaphragm disk 36 and the pressure rod 42 moves against the action of the return spring 38 into application position, as a result of which the service brake is applied. Since in the process the third connection 6 is closed by the valve closing link 10, the brake pressure that is present at the first connection 2 cannot enter the spring chamber 30. Excess pressure in the spring chamber 30 that is then diminishing with respect to its volume is reduced via the non-return valve 60 as is illustrated by the first arrow 66 in FIG. 3.

During a pressure lowering phase within an ABS control cycle, the ABS pressure control valve 58 briefly purges the brake pressure fed to it from the service brake valve into the atmosphere. The control pressure at the first connection 2 of the quick air release valve 1 then drops, while the brake pressure in the pressure chamber 24 or at the second connection 4 that is still high from the preceding pressure holding or pressure increase phase ensures that the valve closing link 10 is pushed away from the pipe connector 18 in the direction of the first connection 2. This situation is shown in the FIGS. 2 and 3. The second connection 4 and the third connection 6 then become flow-connected, as a result of which the compressed air in the pressure chamber 24 that is still under high brake pressure flows from the same via the line 52 and the second inlet 54 into the spring chamber 30, as is illustrated by the second arrow 68 in FIG. 3. This compressed air that flowed into the spring chamber 30 generates a pressure force on the first side 34 of the diaphragm 28 which forces the central part of the diaphragm 28 into the release position to the right which is shown in FIG. 3. This pressure force is supported by the force of the return spring 38. Because of this, the service brake cylinder 22 very quickly reaches the release position during a pressure lowering phase within an ABS control cycle.

When as part of the ABS cycle the pressure lowering phase is followed by a pressure increase phase, the ABS pressure control valve 58 switches the brake pressure preset by the driver or by an electronic driver assistance system again through to the first connection 2, as a consequence of which the valve closing link 10 in turn as described above closes the third connection 6 and opens the flow connection between the first connection 2 and the second connection 4 so that the pressure chamber 24 is charged and the service brake cylinder 22 can again assume the application position because of this.

Instead of a diaphragm 28 with diaphragm disk 36, a rigid piston 70 can also separate the spring chamber 30 from the pressure chamber 24 and serve as actuation element of the service brake cylinder 22, which is shown in FIG. 2. The quick air release valve 1 is then arranged or connected on the service brake cylinder 22 in identical manner.

It is clear, furthermore, that the pressure in the brake line 56, which ultimately (also) controls the quick air release valve 1, cannot only be controlled by an ABS control but also be generated by a corresponding brake request by the driver or driver assistance system without an ABS control intervention taking place or without an ABS control being present in the first place. The pressure in the brake line 56, which at the first connection 2 (co) controls the quick air release valve 1 is then automatically generated dependent on the respective brake request by the driver, i.e. by a service brake valve or by a driver assistance system. Significant for the purely pneumatic control of the quick air release valve 1 directly arranged on the service brake cylinder 22 or of its switching positions are therefore the pressures on its three connections 2, 4 and 6, wherein in particular the pressure at the first connection 2 can be created by various sources (e.g. ABS, driver braking request, driver assistance system).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Quick air release valve
2 First connection
4 Second connection
6 Third connection
8 Center axis
10 Valve closing link
12 Duct
14 Valve housing
16 Further duct
18 Pipe connector
20 Lips
22 Service brake cylinder
24 Pressure chamber
26 First inlet
28 Diaphragm
30 Spring chamber
34 First side
36 Diaphragm disk
38 Return spring
40 Second side
42 Pressure rod
44 Fastening edge
46 First housing part
46a Flange
48 Second housing part
48a Flange
50 Clamping strap
51 Center axis
52 Line
54 Second inlet
56 Brake line
58 ABS pressure control valve
60 Non-return valve
62 Elastic element
64 Passage opening
66 First arrow
68 Second arrow
70 Piston

What is claimed is:

1. A service brake device for vehicles, comprising:
at least one compressed-air actuated service brake cylinder;
at least one of a piston and a diaphragm arranged within the at least one service brake cylinder delimiting
a pressure chamber configured to apply the service brake when compressed air is supplied to the pressure chamber and to release the service brake when compressed air is purged from the pressure chamber; can be supplied with compressed air and for releasing can be purged of the compressed air, and
a spring chamber configured to receive a spring arranged to preload the at least one of the piston and the diaphragm into a service brake release position; and
a quick air release valve having a first connection configured to be in fluid communication with a brake line through which compressed air is supplied to the pressure chamber, a second connection configured to be in fluid communication with the pressure chamber, and a third connection configured to be in fluid communication with the spring chamber,
wherein
when a pressure in the brake line is greater than a pressure in the pressure chamber, the first connection is in fluid communication with the second connection and the third connection is isolated from the first and second connections, and
when the pressure in the brake line is lower than the pressure in the pressure chamber, the second connection is in fluid communication with the third connection and the first connection is isolated from the second and third connections.

2. The service brake device as claimed in claim 1, further comprising:
an ABS controller configured to execute ABS control of the pressure in the brake line when ABS control is activated.

3. The service brake device as claimed in claim 2, further comprising:
at least one of an ABS pressure control valve and a pressure regulation module in the brake line upstream of the quick air release valve,
wherein the ABS controller controls activation of the at least one of the ABS pressure control valve and the pressure regulation module when ABS control is activated to lower the pressure in the brake line.

4. The service brake device as claimed in claim 3, wherein the quick air release valve is configured to isolate the third connection and place the first and second connections into fluid communication during ABS control when the pressure in the brake line is greater than a pressure at the third connection.

5. The service brake device as claimed in claim 4, wherein the quick air release valve includes a moveable valve closing link configured to be moved between a supply position in which the third connection is isolated from the first and second connections to a second position in which the first connection is isolated from the second and third connections.

6. The service brake device as claimed in claim 5, wherein the quick air release valve is arranged directly on the service brake cylinder.

7. The service brake device as claimed in claim 6, wherein the service brake device is a pneumatic or an electropneumatic service brake device.

8. The service brake device as claimed in claim 7, wherein the spring chamber includes a non-return valve configured to release pressure in the spring chamber to the atmosphere.

* * * * *